United States Patent [19]

White et al.

[11] E Re. 30,087

[45] Reissued Aug. 28, 1979

[54] COHERENT SAMPLED READOUT CIRCUIT AND SIGNAL PROCESSOR FOR A CHARGE COUPLED DEVICE ARRAY

[75] Inventors: Marvin H. White, Laurel; David H. McCann, Jr., Ellicott City; Ingham A. G. Mack, Prince George; Franklyn C. Blaha, Glen Burnie, all of Md.

[73] Assignee: Westinghouse Electric Corp., Pittsburgh, Pa.

[21] Appl. No.: 642,032

[22] Filed: Dec. 18, 1975

Related U.S. Patent Documents

Reissue of:

[64] Patent No.: 3,781,574
Issued: Dec. 25, 1973
Appl. No.: 299,480
Filed: Oct. 20, 1972

[51] Int. Cl.[2] ..... H03K 3/353; G11C 19/28; H04B 1/04; H01L 29/78

[52] U.S. Cl. ..... 307/304; 307/221 D; 307/353; 328/151; 328/165; 357/24

[58] Field of Search ..... 357/24; 307/221 D, 304, 307/251, 235 A, 235 B, 235 C, 237, 246; 328/151, 165

[56] References Cited

U.S. PATENT DOCUMENTS

| | | | |
|---|---|---|---|
| 3,537,019 | 10/1970 | Reichard | 328/165 |
| 3,720,922 | 3/1973 | Kosonocky | 357/24 |
| 3,789,312 | 1/1974 | Heller et al. | 307/304 |

OTHER PUBLICATIONS

Kosonocky, "Charge Coupled Digital Circuits" IEEE J. Solid-State Circuits, vol. SC-6 (10/71), pp. 314-322.
Terman, "Charge-Coupled Device Shift Register Read/Write/Regeneration Circuit", IBM Tech. Disclosure Bulletin, vol. 14 (5/72), pp. 3784-3785.
Dennard et al., "Read/Write Amplifier for Charge-Coupled Device Memory", IBM Tech. Disclosure Bulletin, vol. 14 (5/72), pp. 3722-3723.
Dennard, "Regeneration Circuit for Charge-Coupled Device Shift Registers", IBM Tech. Disclosure Bulletin, vol. 14 (5/72), pp. 3791-3792.

*Primary Examiner*—William D. Larkins
*Assistant Examiner*—Gene M. Munson
*Attorney, Agent, or Firm*—D. Schron

[57] ABSTRACT

A coherent sampled CMOS readout circuit and signal processor coupled to a CCD shift register operated by a two-phase minority carrier transfer clock system. The invention comprises a multiplex MIS switch, a reverse biased collection diode, an N channel MOSFET reset switch, a P channel MOSFET electrometer amplifier, and a sample and hold circuit, the configuration having four distinct operational timing subintervals within a clock period wherein the charge is shifted from one shift register bit to another and finally to the output bit. This removes the Nyquist noise associated with the reset switch, suppresses switching transients and 1/f surface noise to thereby improve the signal to noise ratio, i.e., dynamic range, for a CCD array and readout system.

11 Claims, 7 Drawing Figures

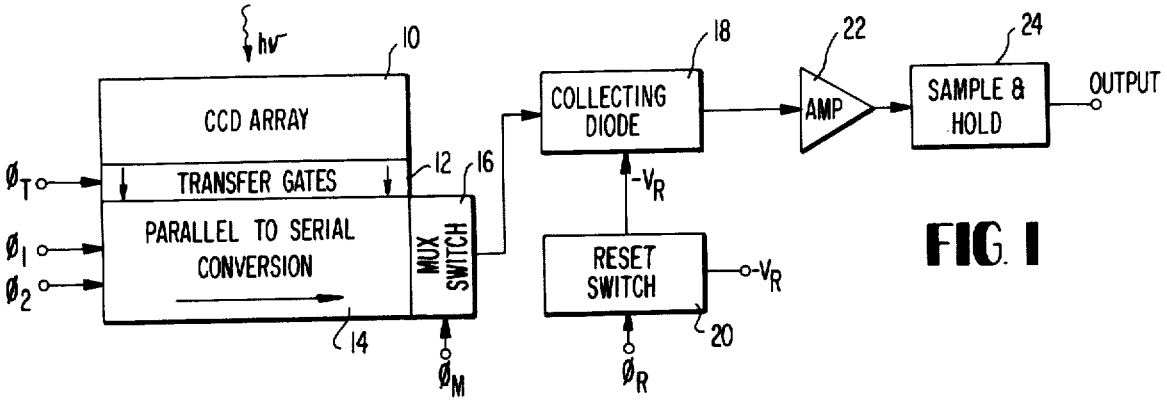
FIG. 1
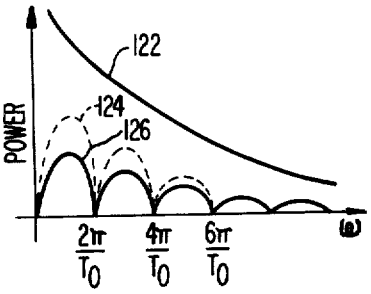
FIG. 7
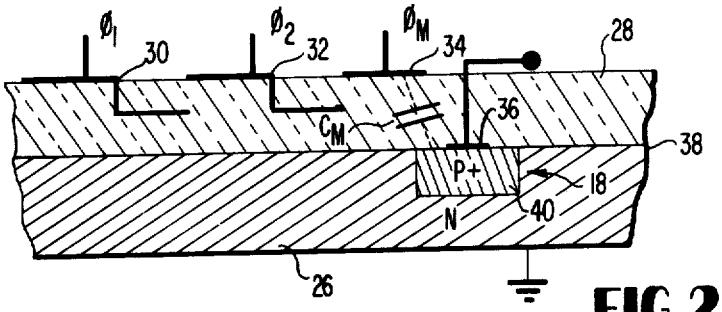
FIG. 2
FIG. 3
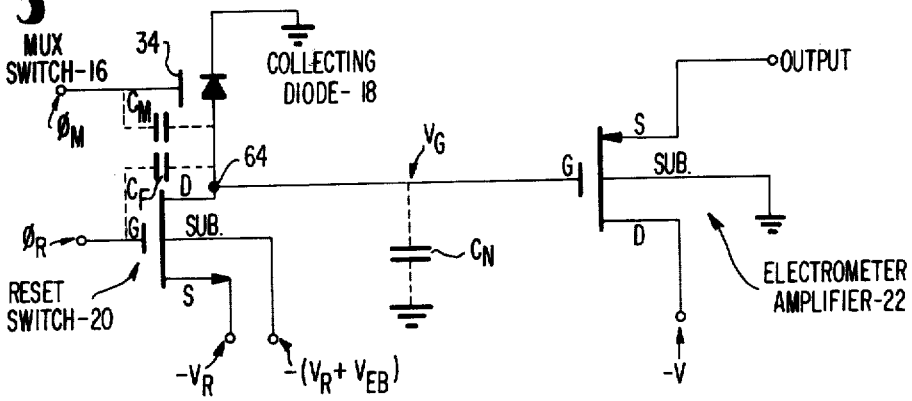
FIG. 4
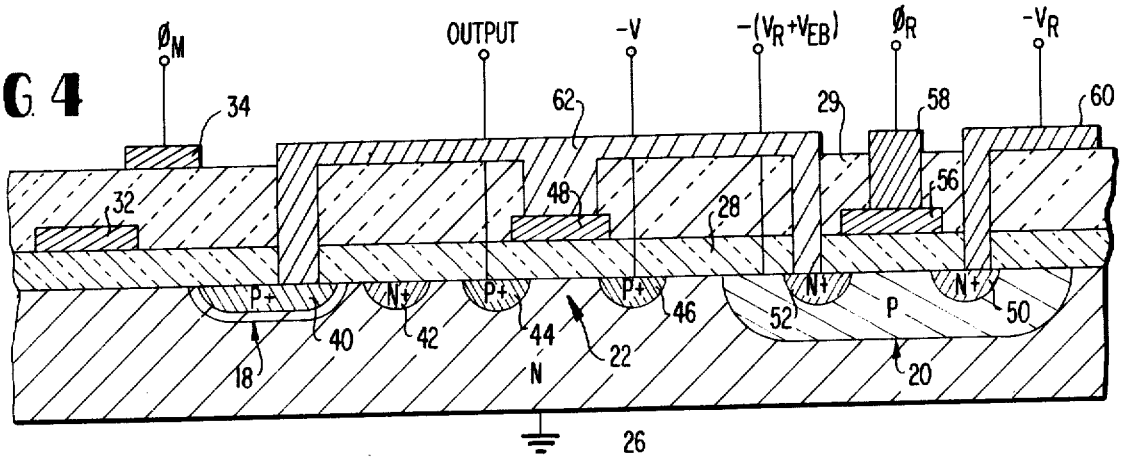

COHERENT SAMPLED READOUT CIRCUIT AND SIGNAL PROCESSOR FOR A CHARGE COUPLED DEVICE ARRAY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to charge coupled device (CCD) technology, and more particularly, to semiconductor apparatus for providing respective output signals indicative of the sequential transfer of minority carrier packets from a CCD shift register.

2. Description of the Prior Art

A new class of monolithic semiconductor apparatus adapted for storing and sequentially transferring electronic signals representing information in the form of packets of excess minority carriers localized in artificially induced potential wells has been disclosed by W. S. Boyle and G. S. Smith, in an article entitled "Charge Coupled Semiconductor Devices," B.S.T.J. April, 1970, pages 587–593, inclusive. Such apparatus comprises a metal-insulator-semiconductor (MIS) structure wherein a plurality of metal electrodes are disposed in a row over the insulator (dielectric) which in turn overlies and is contiguous with the surface of a semiconductor body. Sequential application of voltages to the metal electrodes induces potential wells adjacent the surface of the semiconductor body in which packets of excess minority carriers can be stored and between which these packets can be transferred. To insure predictable directionality of charge packet transfer, the transfer potential well must be asymmetrical at least during the transfer operation. As disclosed in the Boyle-Smith disclosure, at least three phase clock pulses are required to provide the requisite asymmetry for a uniform dielectric thickness under the gate electrodes and a homogeneous semiconductor.

A two-phase clock CCD system is disclosed in U.S. Pat. No. 3,651,349 issued to Dawon Kahng and Edward H. Nicollian. Charge transfer is accomplished in this configuration by the use of overlapping gate electrodes and/or non-uniform dielectric thicknesses under the gate electrodes so that an appropriately asymmetrical potential well is always formed whenever a voltage is applied to any gate electrode.

Charge coupled devices have also been noted to be particularly adapted to the fabrication of an imaging array where for example a parallel readout of the array is first made to an adjacent shift register with the readout of the shift register then being accomplished serially. Such apparatus is shown in the article entitled "Charge-Coupled Imaging Devices: Experimental Results" published by G. F. Amelio, et al., and appearing in the IEEE Transactions on Electron Devices, November, 1971, at pages 992–996, inclusive.

A charge sensing circuit is also disclosed by the prior art. Such apparatus is disclosed in U.S. Pat. No. 3,623,132, issued to Robert D. Green, and discloses a first field effect transistor being turned "on" during a first phase recurring interval for charging a first capacitor at the gate electrode of an output field effect transistor. During a second phase recurring interval, a second field effect transistor is turned "on" for coupling the first capacitor to a second capacitor at the output of a charge coupled circuit. The voltage on the first capacitor causes an inversion or depletion under the fixed plate of the second capacitor. If the charge coupled circuit is charged, that is it has minority carriers, an inversion region is formed under the fixed plate and electrically connects the second capacitor to the charge coupled circuit. Normally the charge coupled circuit is charged when a binary logic 1 is provided at the input to the circuit. If the inversion layer is formed, the voltage on the first capacitor is substantially reduced and the output transistor is turned "off." If the charge coupled circuit is not charged as when a logic 0 is provided at the input of the charge coupled circuit, the semiconductor substrate beneath the second capacitor plate is only depleted. The voltage on the first capacitor is reduced only slightly, and the output field effect transistor remains "on." The logic state of the charge coupled circuit is sensed by determining whether or not the output field effect transistor remains "on" or is turned "off."

SUMMARY

The present invention is directed to a coherent sampling readout circuit and signal processor which provides time correlation of the output of each bit of a CCD shift register utilized in combination with a CCD line array for removing the Nyquist noise component and switching transients and comprises a multiplex MIS switch formed between the last bit of a CCD shift register and a reverse biased collecting diode, an MOS field effect transistor reset switch of first semiconductivity and a MOS field effect transistor amplifier of opposite type semiconductivity coupled to the collecting diode. A sample and hold circuit includes a first capacitor coupled to the output of the MOS amplifier and control signals are applied to the aforesaid circuit configuration for providing four timing sub-intervals during a charge transfer time period wherein the collecting diode is first reset to a predetermined reference voltage through the reset switch whereupon the circuit node capacitance between the collection diode, reset switch and the amplifier charges to a predetermined reset level. The sample and hold circuit then reads the predetermined reset level across the node capacitance and holds this level across said first capacitor. The MIS switch is then activated to gate out the minority carriers to the collection diode whereupon a difference signal is provided between the previously sampled reset signal level and the signal output from the collecting diode across a second capacitor.

BRIEF DESCRIPTION OF THE DRAWINGS

FIG. 1 is a block diagram illustrative of the preferred embodiment of the subject invention utilized in combination with a charge coupled device array;

FIG. 2 is a partial cross sectional view of monolithic semiconductor charge coupled apparatus illustrative of a two-phase multilevel transfer electrode structure including a MIS output switch and a collecting diode;

FIG. 3 is an electrical schematic diagram of the preferred embodiment of the readout circuit forming the subject invention;

FIG. 4 is a more detailed partial cross-sectional view of a monolithic semiconductor device incorporating the readout circuit of the subject invention;

FIG. 7 is a spectral noise power diagram helpful in understanding the subject invention.

DESCRIPTION OF THE PREFERRED EMBODIMENT

Figure 5:
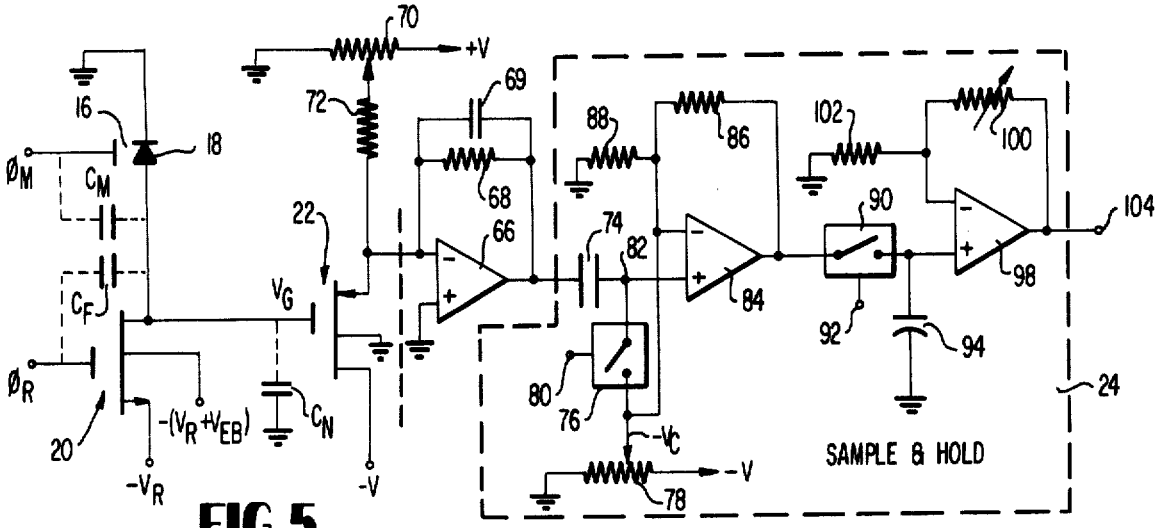
FIG. 5 is an electrical schematic diagram illustrative of the preferred embodiment of the subject invention.

Charge coupled devices (CCD) create and store minority carriers or their absence in potential wells which are spacially defined regions where depletion is momentarily deepened at the interface of a homogeneous semiconductor and oxide insulator. Once stored, the charges coupled to the potential well can be moved over the surface of the semiconductor simply by moving the potential well. The process of injecting charge into a semiconductor either by way of optical or electrical injection, transferring it by means of potential wells along the surface of the semiconductor and detecting it or its absence at some other location or some time later, forms the basis of the circuit operation.

Referring now to the drawings, attention is first directed to FIG. 1, wherein reference numeral 10 represents a linear charge coupled device array which may be operated as a line imaging device as taught by the above-referenced article entitled "Charge-Coupled Imaging Devices: Experimental Results." Minority carrier charge packets are formed at discrete positions along the array 10 in response to an optical signal hv impinging on each discrete region. A like number of transfer gates 12 simultaneously transfer all of the charge packets in the array 10 to a CCD shift register 14 when a gate signal [$0_T$] $\phi_T$ is applied to the transfer gates 12 prior to the beginning of a selected clock period T. The shift register 14 has a bit capacity equal to the number of discrete regions and transfer gates so that a separate bit receives a charge packet from its corresponding array element. The shift register 14 has an appropriate transfer electrode structure suitable for two phase operation. A two-phase clock, not shown, couples mutually 180° out of phase (anti-phase) square wave clock signals [$0_1$ and $0_2$] $\phi_1$ *and* $\phi_2$ to the structure which sequentially shifts the charge packets to a multiplex (MUX) switch 16 which is operated in accordance with a control signal [$0_M$] $\phi_M$ synchronized to the clock signals [$0_1$ and $0_2$] $\phi_1$ *and* $\phi_2$. Thus a parallel to serial conversion is effected. The switch 16 sequentially gates minority charge packets from the last bit of the shift register 14 into a reverse biased output diode 18 which is periodically reset to a reference voltage $V_R$ by means of a MOS reset switch 20 operated in accordance with a reset signal [$0_R$] $\phi_R$ in a manner to be explained in greater detail subsequently. A MOS electrometer amplifier 22 then feeds into a sample and hold circuit 24 whose output comprises sequential video signals corresponding to the sequential output of the shift register 14.

Thus photons incident on the array 10 generate minority carriers which are stored in and moved therefrom through the transfer gates 12 to the shift register 14 which is indexed sequentially to the multiplexed output switch 16 which is adjacent the last transfer electrode, not shown. While the configuration shown in FIG. 1 is directed primarily to optical injection, it should be noted that any other desirable type of minority carrier generation, e.g., electrical injection can be utilized when desired.

Referring now to FIG. 2, a grounded substrate 26 of a first type semiconductivity (shown here illustratively as N type) is shown over which is disposed a dielectric layer 28 comprised of, for example, silicon dioxide $SiO_2$. Transfer electrodes 30 and 32 form the last two transfer electrodes of the shift register 14 shown in FIG. 1. The transfer electrode configuration comprises multilevel elements which when desired, can overlap for two phase operation as taught in the prior art. Another metallic electrode 34 is also fabricated on the dielectric layer 28 adjacent the last transfer electrode 32 between the collecting diode 18 which is formed by a region of second type semiconductivity (P+ type) diffused in the substrate 26. An electrode 36 is formed at the innerface 38 between the insulating layer and the P+ type region 40. The transfer electrodes 30 and 32 are adapted to be coupled to anti-phase clock signals [$0_1$ and $0_2$] $\phi_1$ *and* $\phi_2$, respectively, while the electrode 34 is adapted to be connected to a control signal [$0_M$] $\phi_M$. It is the purpose of the gate electrode 34 and the $SiO_2$ layer 28 to act as a switch for gating minority carriers or the absence thereof from the last potential well formed at the innerface 38 under the last shift register transfer electrode 32 to the collecting diode 18 which occurs when the signal [$0_M$] $\phi_M$ applied to the electrode 34 goes negative.

Referring now to FIG. 3 which discloses the additional readout circuitry employed, the reset switch 20 shown in FIG. 1 comprises an N channel MOS field effect transistor (FET) device fabricated on the same monolithic semiconductor structure shown in FIG. 2, while the electrometer amplifier 22 comprises a complementary P channel MOS field effect transistor device. A cross-section of the circuitry shown in FIG. 3 fabricated in an integrated circuit structure is shown in detail in FIG. 4. Referring now to FIG. 4, the N type semiconductor substrate 26 shown in FIG. 2, includes in addition to the P+ diffusion region 40, for forming the collecting diode 18, an N+ diffusion region 42 which acts as an isolation region. The P channel MOSFET electrometer amplifier 22 is fabricated between the collecting diode 18 and the N channel MOSFET reset switch 20 such that the P+ diffusion regions 44 and 46 define the source and drain respectively of the P channel FET while the gate electrode comprises a contact electrode 48 deposited on the oxide layer 28 overlapping the source and drain diffusions 44 and 46. The N channel MOSFET switch comprises N+ diffusion regions 50 and 52 which define the source and drain of an FET within a P type diffusion region 54. The gate electrode of the N channel MOSFET reset switch 20 comprises the contact electrode 56 deposited on the oxide layer 28 and overlapping the source and drain diffusions 50 and 52 with a metallization element 58 formed through a second oxide layer 29. The control signal [$0_R$] $\phi_R$ is adapted to be coupled to the gate of the MOSFET reset switch 20 through the metallization 58. A metallization 60 is coupled to the source diffusion region 50 through the oxide layers 28 and 29 and is adapted to have a reference reset potential $-V_R$ applied thereto. A common connection between the P+ diffusion region 40 of the collecting diode 18, the drain diffusion region 52 of the N channel MOSFET switch 20 and the gate electrode formed by the contact electrode 48 of the P channel MOSFET amplifier 22 is provided by the bridge type metallization 62. Ohmic contact of P channel amplifier 22 is obtained by means of a deposited metallization to obtain the output and $-V$ terminals respectively.

Referring now to the schematic representation of the subject invention as shown in FIG. 5, the collecting diode 18 is shown having its cathode coupled to ground (substate 26 at ground potential) while the anode has a common connection between the drain of the N channel MOSFET reset switch 20 and the gate of the P channel MOSFET amplifier 22. This common connection (metallization 62 shown in FIG. 4) forms a circuit node 64 having a distributed capacitance $C_N$ to ground. A distributed capacitance $C_M$ also exists between the gate electrode 34 of the output MUX switch 16 and circuit node 64. Additionally, a distributed capacitance $C_F$ also exists between the gate electrode of the MOSFET reset switch 20 and the circuit node 64. These capacitances affect the operation of the circuit as will be subsequently shown. As already disclosed, a control signal [$0_M$] $\phi_M$ is applied to the switch electrode 34 and a reset control signal [$0_R$] $\phi_R$ is applied to the gate of the reset switch 20. The reset reference voltage $-V_R$ is applied to the source of the reset switch 20 while a slightly greater bias voltage $-(V_R+V_{EB})$ where $V_{EB}$ is equal to an emitter to base diode forward drop is applied to the substrate of the MOSFET reset switch 20. This substrate corresponds to the P diffusion region 54 shown in FIG. 4. The substrate of the N channel MOSFET reset switch 20 is biased slightly more negative than the source in order to avoid forward biasing the drain to substrate junction when the reset switch is turned off. For example, where $V_R=-6$ v and $V_{EB}=-0.7$ v, if the voltage of [$0_R$] $\phi_R$ varies between 0 and $-6.0$ v, when the reset switch 20 is turned off, i.e., when [$0_R$] $\phi_R=-6.0$ v, the effect of the capacitance $C_F$ and $C_N$ acting as a voltage divider causes a voltage corresponding to $-6.0$ $[C_F/(C_F+C_N)]=-0.2$ v to appear at the circuit node 64 where typical value of $C_F$ and $C_N$ are in the order of 0.035 picofarads and 1.0 picofarads. Thus the circuit node voltage would go to $-6.2$ v i.e. $-V_R+(-0.2$ v.) However with the increased bias, i.e., $-6.7$ v., applied to the substrate of the reset switch 20, the drain can never become more negative than the substrate. Thus when the reset switch is turned off, the circuit node 64 is a relatively high time constant voltage point which is provided by the node capacitance $C_N$ and the off resistance of the reverse bias collecting diode 18 and the drain to substrate junction of the reset switch 20.

With respect to the P channel MOSFET amplifier 22, the substrate is grounded since it actually is part of the N type semiconductor substrate 26 shown in FIG. 4. The drain electrode is coupled to a negative bias voltage $-V$ and the output signal of the readout circuit is taken from the source of amplifier 22.

Referring now to FIG. 5, the output of the P channel MOSFET amplifier 22 is coupled to the sample and hold circuitry 24 by means of a preamplifier stage comprising an operational amplifier 66 and feedback resistor 68. The source electrode of the P channel MOSFET amplifier 22 is further biased by means of the potentiometer 70 coupled across a source of positive bias potential $+V$ and a fixed resistor 72 coupled to the slider element of the potentiometer 70. The sample and hold circuit 24 includes a first or "clamp" capacitor 74 having one side coupled to the node capacitance $C_N$ through the output of the operational amplifier 66 while the other side is coupled to electrically controlled switch device 76 which may be, for example, a MOS switch. The switch 76 couples to a negative reference voltage $-V_C$ provided by a potentiometer 78 coupled across the voltage $-V$. The switch device 76 is adapted to be opened and closed in accordance with a synchronized control voltage applied to terminal 80 and depicted in FIG. 6. Circuit junction 82 which comprises the common connection between the capacitor 74 and the switch 76 is coupled to one input of an operational amplifier 84 which has another input connected to the reference voltage $-V_C$ at the potentiometer 78 which also acts as a clamping voltage or DC restorer voltage for the capacitor 74 and the operational amplifier 84. Additionally, the operational amplifier has a feedback network including resistors 86 and 88 coupled from the output of the operational amplifier to the same input to which the reference voltage $-V_C$ is applied. The output of the operational amplifier 84 is fed to a second electrically operated switch 90 which is opened and closed in response to another synchronized control voltage applied to terminal 92 (FIG. 6) as in the case of the electrically operated switch 76; switch 90, when desirable, may also comprise an MOS switch device. The switch 90 is coupled to a second or "sample" capacitor 94 which has its opposite side returned to ground. Circuit junction 96 which forms the common connection between the electrically operated switch 90 and the capacitor 94 is coupled to another operational amplifier 98 which has a feedback network including the variable resistor 100 and fixed resistor 102 coupled from the output to another input thereof. The output of the operational amplifier is connected to a circuit terminal 104 which is adapted to provide a video output signal of the minority carrier charge packet fed into the collecting diode 18.

Figure 6:
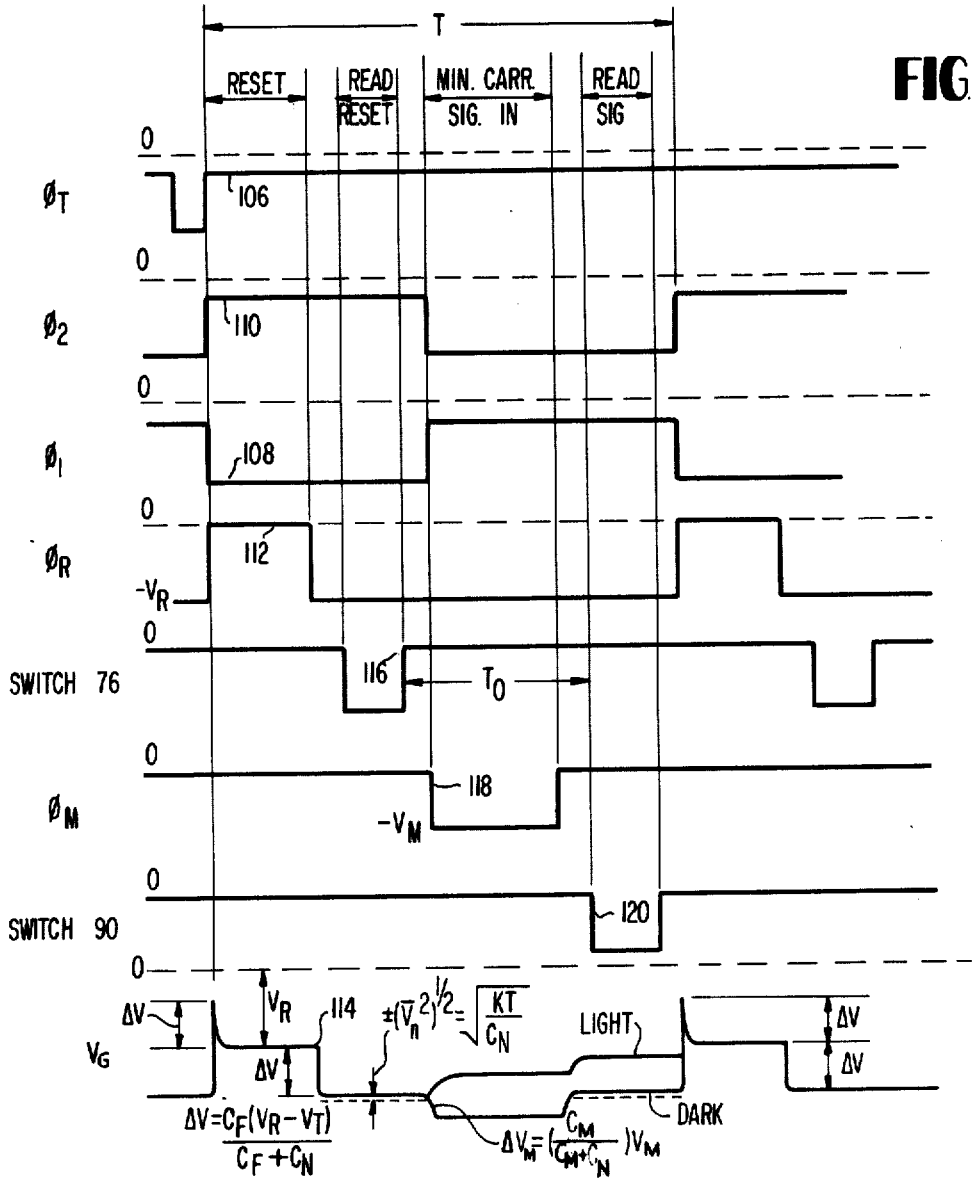
FIG. 6 is a series of time related waveforms illustrative of the operative of the subject invention.

The operation of the readout and signal processor circuitry can best be understood in light of the timing signals indicated by the time related waveforms shown in FIG. 6. There are four distinct timing subintervals in each time clock period T, that is the time within which the two phase clock system steps each charge packet from one transferred electrode to another in the shift register 14 shown in FIG. 1. While each charge packet is being shifted, the last or output bit of the shift register is being read out and processed by the circuitry shown in FIG. 5. The timing diagram shown in FIG. 6 first discloses waveform 106 which corresponds to the control voltage $0_T$ which periodically effects the parallel transfer of all the minority carrier charge packets from the CCD array 10 to the shift register 14 by means of the transfer gates 12. This waveform is a negative going waveform and occurs prior to the beginning of the anti-phase clock voltages [$0_1$ and $0_2$] $\phi_1$ *and* $\phi_2$ shown by waveforms 108 and 110, respectively. It is to be observed that the second clock voltage [$0_2$] $\phi_2$ is applied to the last transfer electrode 32 of the shift register (FIG. 2). A charge packet from the next to last bit of the shift register will not be transferred to the last bit until the potential well under the last transfer electrode 32 goes further negative which is after one half of a clock period T. During a portion of the first half of the clock period T a reset control signal [$0_R$] $\phi_R$ applied to the gate of the N channel MOSFET reset switch 20 goes high, i.e., from $-6.0$ volts to 0 volts as shown by waveform 112. When the waveform 112 goes to 0 volts, the N channel MOSFET reset switch 20 is turned "on" and the node voltage $V_G$ which appears across node capacitance $C_N$ goes to the reference voltage $-V_R$ after an initial transient $\Delta V=C_F(V_R-V_T)/(C_F+C_N)$ where $V_R=-6.0$ v and $V_T=2.0$ v, the device threshold voltage. After the switching transient $R_{ON}C_N\approx 10$ nanoseconds the circuit node voltage is equal to $-V_R$ which charges the node capacitance $C_N$. In charging the node capacitance $C_N$, the voltage $-V_R$ has an uncertainty expressed by the Nyquist voltage $(\overline{V}_n^2)^{\frac{1}{2}}=(kT/C_N)^{\frac{1}{2}}$ wherein k is equal to Boltzman's constant, T is the temperature, and $C_N$ is the node capacitance.

The reset signal [$0_R$] $\phi_R$ is next removed by making [$O_R$] $\phi_R$ again go to $-6.0$ volts. Since the collecting diode 18 is reverse biased, and MOSFET switch 20 is now "off," the discharge time constant of the node capacitance $C_N$ becomes extremely long (in order of 10 seconds with respect to the clock period T (typically less than 100 microseconds). Thus the node capacitance $C_N$ will maintain the charge corresponding to the reference voltage $-V_R\pm(\overline{V}_n^2)^{\frac{1}{2}}$. This defines the first subinterval called the "reset" time. Following this, the second subinterval comprises the application of a low going control voltage shown [76] by waveform 116 to the electrically controlled switch 76 in the sample and hold circuit 24 which closes. Capacitor 74 is thus connected across the node capacitance $C_N$ and charges to the voltage thereacross while being clamped to the voltage $-V_C$. The waveform 116 then returns to a zero level opening the switch 76. The opening of switch 76 by waveform 116 ends the second subinterval which is defined as the "read reset" time causing the voltage across capacitor 74 to be such that the voltage $-V_R-\Delta V\pm(\overline{V}_n^2)^{\frac{1}{2}}=V_2$ applied to the node capacitor $C_N$ is read and clamped. Next a negative or low going control signal [$0_M$] $\phi_M$ as shown by waveform 118 in FIG. 6 is applied to the MUX switch electrode 34 (FIG. 2) whereupon the minority carrier packet in the potential well under the last bit transfer electrode 32 is transferred to the reversed biased collecting diode 18. The collection of minority carriers causes the voltage across the node capacitor $C_N$ to change by a voltage $$\Delta V_M=[C_M/(C_M+C_N)]V_M$$

where $V_M$ is the voltage amplitude of the "MUX" signal [$0_M$] $\phi_M$ shown in FIG. 6. The voltage on the circuit node 64 during this subinterval is $$V_S-V_R-\Delta V-\Delta V_M\pm(\overline{V}_n^2)^{\frac{1}{2}}$$

as shown in FIG. 6, where $V_S$ is the signal voltage. Assuming that the CCD array 10 is an imaging array and the instant charge packet corresponds to a dark level, the voltage at $V_G$ will decrease as shown by waveform 114 whereas if the bright signal appears, the voltage $V_G$ will tend to go more positive. The control signal [$0_M$] $\phi_M$ is then removed ending the third subinterval defined as the "minority carrier signal input" time. When the "MUX" signal [$0_M$] goes from $-V_m$ to 0 as shown in FIG. 6, a charge is removed from circuit node 64 corresponding to $+\Delta V_M$. Thus the switching transient charge is removed from the signal processing which increases the dynamic range of the processor. During the "read minority carrier signal" subinterval the voltage level of the circuit node 64 is $-V_R-\Delta V\pm(\overline{V}_n^2)^{\frac{1}{2}}+V_S=V_4$ where $V_S=Q_s/C_N$ is the signal input determined by the signal charge $Q_s$. After the MUX switch 16 is turned off, the output voltage across capacitor 74 consists of a time correlated difference signal between the input signal plus the reset level and the reset level due to the fact that the switch 76 is now in the open state. The fourth or "read minority carrier signal" subinterval occurs after the MIS switch 16 is turned off and a negative or low going control signal is applied to the second switch 90 by means of a signal corresponding to the waveform 120 shown in FIG. 6 being applied to terminal 92 whereupon the switch 90 closes. Since there is negligible leakage of the reset level at circuit node 64 due to the extremely long discharge time constant $R_{OFF}C_N$ provided by node capacitance $C_N$ and the off resistance provided by the non conducting drain to substrate junction of MOSFET 20 and reversed biased collecting diode 18, closure of switch 92 results in a sampled voltage appearing across capacitor 94 which is a measure of the time difference between the signal plus the reset level minus the reset level, i.e., $V_4-V_2=[-V_R-\Delta V+V_s\pm(\overline{V}_n^2)^{\frac{1}{2}}]-[-V_R-\Delta V\pm(\overline{V}_n^2)^{\frac{1}{2}}]=V_s$. What is significant about the operation thus described, is that the sampled noise, i.e., the Nyquist voltage uncertainty at the "read reset" time is the same as sampled at the "read minority carrier signal" time. Thus the noise is said to be correlated.

With this method of signal processing several important advantages are derived which is particularly important for low light level detection in an imaging array. First of all, switching transients are removed since the feedthrough voltage is sampled and held during the "read reset" subinterval when the reset switch 20 is turned off. Likewise, the stored feedthrough charge transient from the on-going switch 16 is "pulled-out" when the switch is turned off. Secondly, the sampling and holding process moves the Nyquist noise component since the charge packet signal voltage from the shift register is multiplexed onto a known reset level, that is the previously sampled and held reset level $-V_R-\Delta V\pm(\overline{V}_n^2)^{\frac{1}{2}}$ the noise voltage contribution from the reset switch is removed in the time difference operation. In other words, a time correlation method of removing the Nyquist noise has been provided. The subject invention also provides dark level subtraction to increase dynamic range and provide uniformity across the array. The video signal is clamped to a reference voltage $-V_C$ which is analogous to DC restoration in pick up tubes.

The analog signal processor has another important feature in that it can reduce the 1/f noise component in the signal, collection diode, reset switch and electrometer amplifier. In order to understand this, a simple analysis can be performed to show that the processor transfer function can be written as:

$$|H(\omega)|^2=H_o(\sin^2\omega I_o)/2/(1+\omega^2R^2C^2) \text{ where } \omega=2\pi f,$$

where $H_o$ is adjustable gain, $T_o$ is the time diffrence between read operations as shown in FIG. 6 and RC the time constant of the preamplifier 66 shown in FIG. 5. If 1/f noise is present, then the above transfer function will depress the noise power spectra at low frequencies while allowing the signal to pass unattenuated and amplified. FIG. 7 illustrates this concept wherein curve 122 depicts the $1/\omega$ noise power spectra at the processor input, curve 124 is illustrative of the noise power spectra at the processor output and curve 126 denotes the transfer function $|H(\omega)|^2$.

In summation therefore, the subject invention is directed to readout and signal processor circuitry for a parallel to serial conversion CCD array wherein the white noise, i.e., Nyquist noise, is first measured and then the signal level itself including the white noise is measured. A subtraction of the two is then provided which removes the noise in a time correlation process within the same clock period.

Having thus disclosed what is at present considered to be the preferred embodiment of the subject invention:

We claim:

1. A circuit for providing coherent readout and signal processing of charge coupled device (CCD) apparatus having a plurality of clocked transfer electrodes, comprising in combination:

a minority carrier detector circuit;

a minority carrier switch, including a control electrode coupled to a periodic control signal, located between said detector circuit and a transfer electrode of said CCD apparatus and being operable in response to said control signal during a third predetermined time subinterval of a minority carrier transfer clock period to gate a minority carrier charge packet into said detector circuit;

a field effect device of a first semiconductor type, operable as a reset switch, coupled between a predetermined reference voltage and said detector circuit, and being operable in response to another periodic control signal for being rendered conductive during a first predetermined time subinterval of said clock period;

a field effect device of a second semiconductor type, operable as an amplifier, having an input electrode coupled to said first type field effect device and said detector circuit at a common circuit junction, said junction providing a node capacitance thereat which is charged to said reference voltage during said first time subinterval;

a sample and hold circuit including a first capacitor coupled to an output electrode of said second type field effect device, a first electrically operated switch device coupled to said first capacitor and being operable in response to still another periodic control signal for closing said switch means during a second predetermined time subinterval of said clock period whereby said first capacitor charges to said reference voltage appearing across said node capacitance, said minority carrier switch thereafter becoming operable during said third time subinterval wherein a minority carrier charge packet is coupled to said detector circuit and a signal voltage indicative thereof coupled to said first capacitor wherein a voltage subtraction process results, and a second electrically operated switch device operable in response to yet another periodic control signal for controlling said second switch during a fourth and last predetermined time subinterval of said clock period and a second capacitor coupled to said second switch device, said second capacitor sampling the voltage on said first capacitor during said fourth time subinterval and providing a video signal of said minority carrier signal thereacross.

2. The circuit as defined by claim 1 wherein said field effect devices of said first and second type comprise MOS transistors.

3. The circuit as defined by claim 2 wherein said MOS transistor of said first semiconductor type comprises an N channel device [on] *and* said MOS transistor of said second semiconductor type comprises a P channel device.

4. The circuit as defined by claim 1 wherein said minority carrier detector circuit comprises a diode.

5. The circuit as defined by claim 4 wherein said diode comprises an integrated circuit diode including means for being reverse biased.

6. The circuit as defined by claim 4 wherein said field effect devices of said first and second semiconductor type comprise complementary MOS transistors each having a gate, a source, and a drain electrode and wherein said source electrode of the MOS transistor of said first semiconductor type is coupled to said reference voltage, said drain is connected to said diode, and said gate is connected to said another periodic control signal.

7. A circuit as defined by claim 6 wherein said MOS transistor of said first semiconductor type includes a substrate connected to a second predetermined reference voltage of greater magnitude than said first recited predetermined reference voltage and being of the same polarity as said first recited reference voltage.

8. The circuit as defined by claim 7, wherein said MOS transistor of said second semiconductor type includes a gate source and drain electrode and wherein said gate electrode comprises said input electrode, said source electrode comprises said output electrode coupled to said sample and hold circuit and said drain electrode is coupled to a bias potential.

9. The method of operating a charge coupled device circuit for providing coherent readout and signal processing of minority carrier signal packets, comprising the sequential steps of:

turning "on" a semiconductor reset switch and applying a reference voltage $V_R$ across a circuit node capacitance having a common connection with a minority carrier detection circuit, said voltage $V_R$ having an uncertainty expressed by the Nyquist noise voltage $(\overline{V}_n^2)^{\frac{1}{2}}=(kT/C_N)^{\frac{1}{2}}$ when applied across said circuit node capacitance;

turning "off" said reset switch;

reading and holding said reference voltage appearing across said node capacitance by coupling a capacitor across said node capacitance;

uncoupling one side of said capacitor from one side of said node capacitance while remaining coupled to said detection circuit;

coupling a minority carrier signal packet into said detection circuit wherein said minority carriers change the charge state of said node capacitance and said capacitor; and reading the voltage across said capacitor; and sampling the voltage across said capacitor which comprises the difference between said reference voltage and the signal plus said reference voltage thereby removing said Nyquist voltage and switching transients from the signal output to [improved] *improve* dynamic range and provide 1/f noise filtering of the circuit.

10. The method of claim 9 wherein said step of coupling a capacitor across said node capacitance additionally includes clamping the voltage across said capacitor to a second reference voltage $V_C$.

*11. Circuitry for coherent readout and signal processing of charge storage apparatus, comprising:*

*a charge storage detector circuit operable to receive an information signal;*

*a first field effect device operable as an amplifier and having an input and an output;*

*a second field effect device operable as a reset switch, coupled to said input;*

*said input constituting a circuit node capacitance;*

*said second field effect device being operable to apply a reference voltage to said node capacitance;*

*means coupled to said output for sampling and holding said reference voltage applied to said node capacitance;*

*means operable subsequent to said sampling to couple said information signal to said node capacitance;*

*said sampling and holding means being thereafter operable to again sample the voltage applied to said node capacitance for obtaining a resultant signal which is indicative of the difference between said two samplings.*

* * * * *